J. F. CUMMINGS.
FRICTION BRAKE.
APPLICATION FILED MAR. 27, 1908.
925,303.
Patented June 15, 1909.
2 SHEETS—SHEET 1.
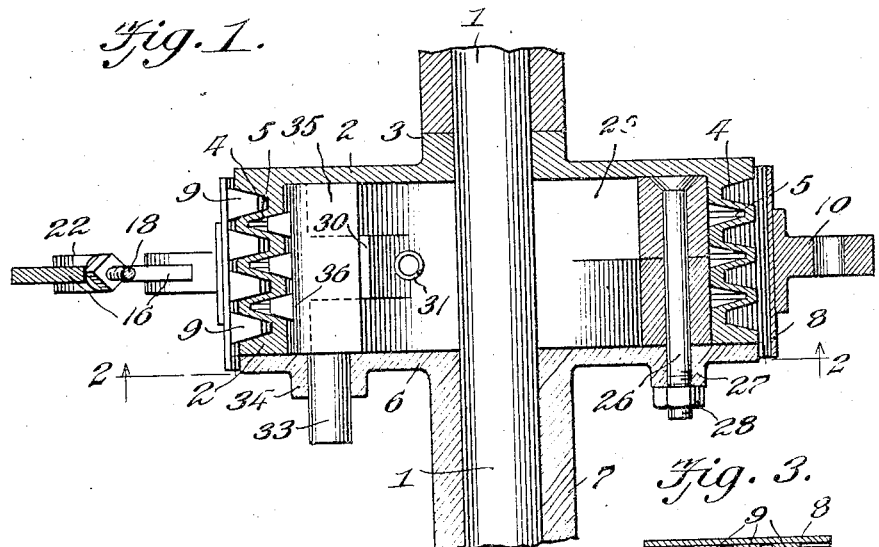
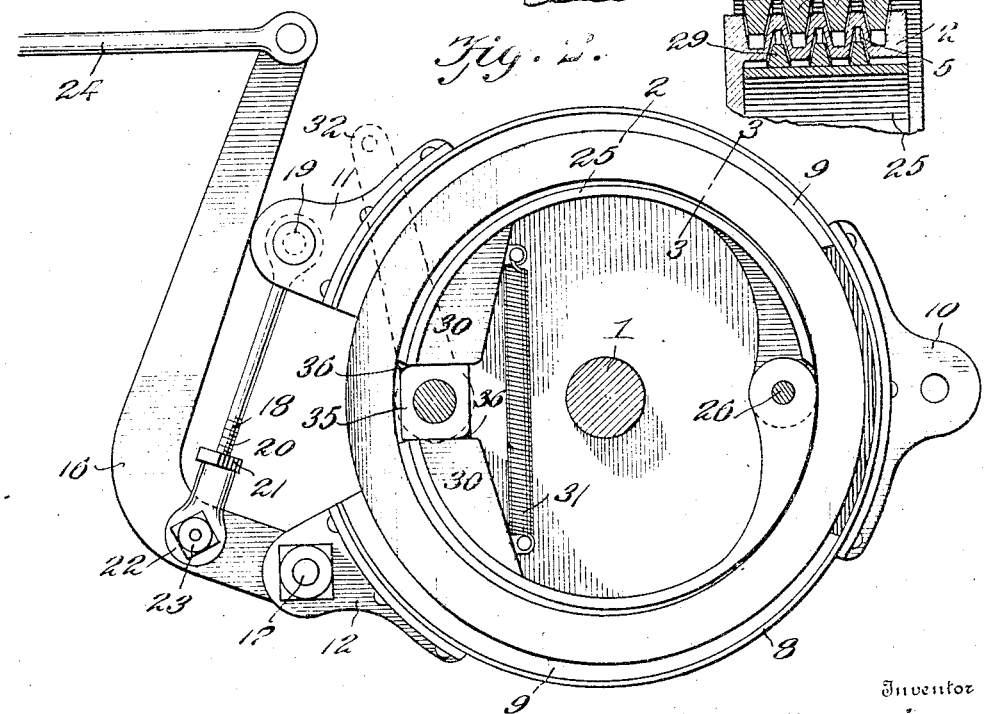
Witnesses
Frank B. Hoffman
Inventor
John F. Cummings
By Victor J. Evans
Attorney J. F. CUMMINGS.
FRICTION BRAKE.
APPLICATION FILED MAR. 27, 1908.
925,303.
Patented June 15, 1909.
2 SHEETS—SHEET 2.
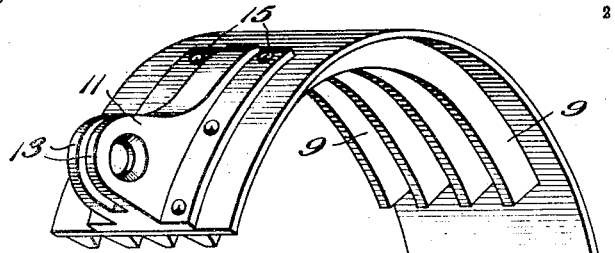
Fig. 4.
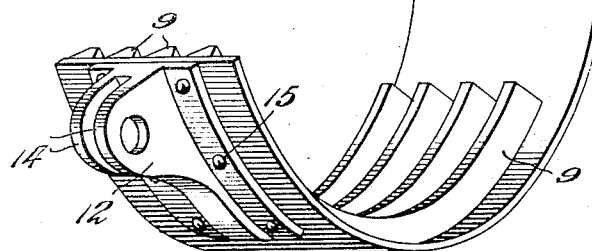
Fig. 5.  Fig. 6.
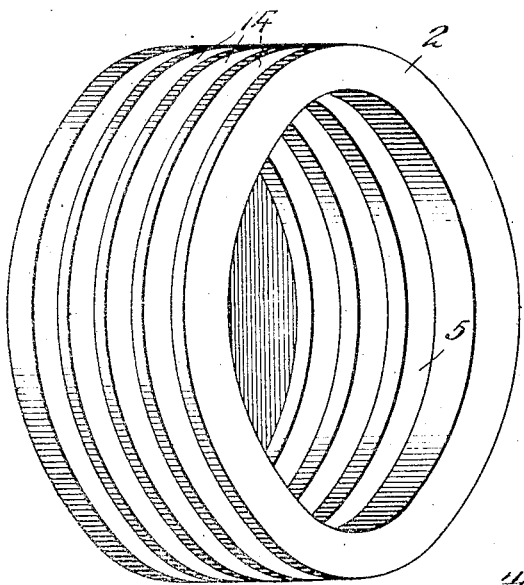
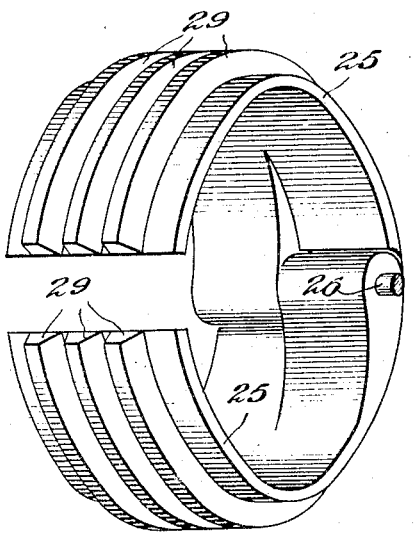
Fig. 7.
Witnesses
Frank B. Hoffman
Inventor
John F. Cummings
By Victor J. Evans
Attorney

UNITED STATES PATENT OFFICE.

JOHN F. CUMMINGS, OF PROVIDENCE, RHODE ISLAND.

FRICTION-BRAKE.

No. 925,303.　　　　Specification of Letters Patent.　　Patented June 15, 1909.

Application filed March 27, 1908. Serial No. 423,576.

*To all whom it may concern:*

Be it known that I, JOHN F. CUMMINGS, a citizen of the United States of America, residing at Providence, in the county of Providence and State of Rhode Island, have invented new and useful Improvements in Friction-Brakes, of which the following is a specification.

This invention relates to friction brakes, and one of the principal objects of the same is to provide a double friction brake in which there is a stationary central member and a movable inner and outer member, the outer member serving as a hand brake and the inner member serving as a foot brake.

Another object of the invention is to provide a brake comprising a stationary member having V-shaped angular grooves therein upon both its inner and outer sides and a brake shoe comprising a series of V-shaped ribs to engage the grooves of the stationary member.

These and other objects may be attained by means of the construction illustrated in the accompanying drawings, in which,—

Figure 1 is a central vertical section taken through a brake made in accordance with my invention. Fig. 2 is an end view of the same with one of the casing heads removed. Fig. 3 is a detail sectional view on the line 3—3 of Fig. 2. Fig. 4 is a perspective view of the strap or ring carrying the V-shaped ribs. Fig. 5 is a similar view of the intermediate or stationary member. Fig. 6 is a similar view of the inner member. Fig. 7 is a detail sectional view of a modified form.

Referring to the drawings for a more specific description of my invention, the numeral 1 designates a shaft, and mounted on this shaft is the stationary member 2 of the brake which is provided with a boss 3 through which the shaft 1 passes, an integral head or disk and a peripheral surface composed of a series of V-shaped grooves 4, while the inner surface is also provided with a series of similar grooves 5, as shown more particularly in Fig. 1. A face plate 6 provided with a boss 7 through which the shaft 1 passes is secured to the opposite side of the stationary member.

A resilient metal band 8 surrounds the stationary member 2 and is provided with a series of curved ribs 9 of the required shape to fit within the groove 4 of the member 2. The ribs 9 are slightly larger than the grooves in order that the ends of the ribs will not reach the bottom of the grooves when the brake is applied. A bracket 10 is secured to the center of the resilient band 8, as shown in Fig. 2, and at the terminal ends of the band 8 bearings 11, 12 are provided, said bearings having spaced lugs 13, 14, and said bearings being connected by rivets 15 to the band 8. Pivoted between the lugs 14 is a curved lever 16, a bolt 17 forming the pivotal point of said lever.

A connecting rod 18 is pivoted at 19 to the bearing 11, and upon the outer end of said connecting rod screw threads 20 are provided. A stop nut 21 is adjustably mounted upon the threaded portion of the rod 18, and a bifurcated keeper 22 is connected by a bolt 23 to the lever 16. A hand operating bar or lever 24 is connected to the end of the lever 16 for applying the brake band. The stop nut 21 may be adjusted upon the rod 18 to determine the depth at which the ribs 9 are permitted to enter the grooves 4.

On the interior of the stationary member 2 is a brake comprising two members 25 pivotally connected together upon the bolt 26 which extends through the enlarged portions of said members and projecting through a boss 27 upon the face plate 6, a nut 28 being provided for securing said parts in place. The members 25 are each provided upon their outer surface with curved ribs 29 designed to engage the grooves 5 in the interior of the stationary member 2. The members 25 are provided with enlarged ends 30, and a spring 31 is connected to said enlargements, the tension of said spring being exerted to draw the ends of the members 25 together and to relieve the bearing of the ribs 29 in the grooves 5. A lever 32 is fixed to the stud 33 projecting through a boss 34 on the face plate 6, and formed integral with the stud 33 is a cam 35 having oppositely disposed rounded corners 36. When the lever 32 is depressed at its outer end by means of a foot treadle, not shown, the rounded corners 36 bear outward upon the enlargement 30 of the members 25 and crowd the ribs 29 within the grooves 5, and when pressure upon the lever 32 is released the spring 31 draws the parts 35 together to release the ribs 29 from the grooves 5.

As shown in Fig. 7 the ribs 9 or 29 are modified to some extent. Instead of making solid ribs they may be made hollow, as shown at 9ª, and said ribs are secured by means of fastenings a at suitable points, said fastenings passing through the metal from which the ribs are formed and into the member 25 or 8.

From the foregoing it will be obvious that my brake is operative by a hand lever and by a foot lever, and that whenever an emergency brake is required both of said brakes may be applied.

My brake is of comparatively simple construction, and owing to the V-shaped grooves and similarly shaped ribs a very large brake surface is provided and a very powerful brake obtained.

Having thus described the invention, what is claimed as new, is:—

A brake comprising an intermediate member mounted upon a shaft and comprising a ring provided with exterior peripheral grooves and intermediate ribs, the interior surface of said member being provided with ribs and intermediate grooves, an outer brake member comprising a resilient band, means for applying said outer brake member, an inner brake comprising pivoted members having exterior ribs to fit the interior grooves, and means for applying said inner brake.

In testimony whereof I affix my signature in presence of two witnesses.

JOHN F. CUMMINGS.

Witnesses:
WALTER D. BROWNELL,
WALTER F. WILLIS.